United States Patent
Fukita

[11] Patent Number: 5,900,903
[45] Date of Patent: May 4, 1999

[54] DEFLECTING SCANNING APPARATUS

[75] Inventor: Taku Fukita, Tokyo, Japan

[73] Assignee: Canon Kabushiki Kaisha, Tokyo, Japan

[21] Appl. No.: 08/612,495

[22] Filed: Mar. 7, 1996

[30] Foreign Application Priority Data

Mar. 29, 1995 [JP] Japan ................................. 7-098121

[51] Int. Cl.$^6$ .............................. B41J 2/47; G02B 26/08; H02K 5/10
[52] U.S. Cl. ..................... 347/260; 347/257; 359/200; 384/94; 384/124; 384/107; 310/105
[58] Field of Search ..................................... 347/263, 260, 347/261, 259, 256, 257, 258; 359/200, 198; 384/114, 94, 124, 125, 107, 109, 113; 310/105, 121

[56] References Cited

U.S. PATENT DOCUMENTS

| | | | |
|---|---|---|---|
| 4,726,640 | 2/1988 | Iwama et al. | 359/200 |
| 4,805,972 | 2/1989 | Tanaka et al. | 384/124 |
| 5,069,515 | 12/1991 | Itami et al. | 359/200 |
| 5,097,164 | 3/1992 | Nakasugi et al. | 384/114 |
| 5,532,729 | 7/1996 | Nakasugi | 347/260 |
| 5,731,831 | 3/1998 | Murabe et al. | 347/259 |

FOREIGN PATENT DOCUMENTS 06075185  3/1994  Japan .

*Primary Examiner*—Peter S. Wong
*Assistant Examiner*—K. Shin
*Attorney, Agent, or Firm*—Fitzpatrick, Cella, Harper & Scinto

[57] ABSTRACT

In a deflecting/scanning apparatus, a rotating polygon mirror is rotatably supported by an air bearing constituted by a stationary shaft and a rotating sleeve which are made of a ceramic material. An upper portion of an end face of the rotating sleeve is covered with a lid as a separate member. A vent hole formed in the lid is sealed with an adhesive to form an air damper chamber.

38 Claims, 3 Drawing Sheets

DEFLECTING SCANNING APPARATUS

BACKGROUND OF THE INVENTION

1. Field of the Invention

The present invention relates to a deflecting/scanning apparatus having an air bearing and serving to scan a light beam such as a laser beam on a photosensitive member.

2. Related Background Art

A bearing rotating apparatus using an air bearing in a conventional deflecting/scanning apparatus is disclosed in, e.g., Japanese Laid-Open Patent Application No. 6-75185. As shown in FIG. 1, this apparatus comprises a motor housing 1, a stationary shaft 2 held by the motor housing 1, and a rotating sleeve 3. A rotating polygon mirror 5 is fixed to the rotating sleeve 3 with a leaf spring 6 via a rotating member 4. The rotating member 4 has a drive magnet 7. A drive motor 10 for rotating the rotating sleeve 3 is constituted by the drive, magnet 7, a stator 8, and a motor board 9 on which electric parts and the like are mounted.

In the above prior art, however, since the rotating sleeve 3 is not in the form of a bag with respect to the stationary shaft 2, no air damper effect can be obtained. This structure is therefore susceptible to vibrations in the thrust direction. Forming the rotating sleeve 3 into a bag-like shape costs too much because it is difficult to process a ceramic material. In addition, a vent hole is required to facilitate assembly of the rotating sleeve 3 and the stationary shaft 2. However, in order to obtain an air damper effect, the vent hole must be sealed after the assembly.

SUMMARY OF THE INVENTION

It is an object of the present invention to provide a deflecting/scanning apparatus having a simple arrangement, which can solve the above problems and has an air damper effect.

In order to achieve the above object, according to the present invention, there is provided a deflecting/scanning apparatus in which a rotating polygon mirror is rotatably supported by an air bearing constituted by a stationary shaft and a rotating sleeve which are made of a ceramic material, characterized in that an upper portion of an end face of the rotating sleeve is covered with a lid as a separate member, and a vent hole formed in the lid is sealed with an adhesive to form an air damper chamber.

In the deflecting/scanning apparatus having the above arrangement, the lid using a separate member and having a vent hole is fixed to the rotating sleeve made of a ceramic material, the rotating sleeve is fitted on the stationary shaft made of a ceramic material, and the vent hole is sealed with an adhesive to form an air damper chamber.

DETAILED DESCRIPTION OF THE PREFERRED EMBODIMENTS

The present invention will be described in detail below with reference to FIGS. 2 and 3.

Figure 1:
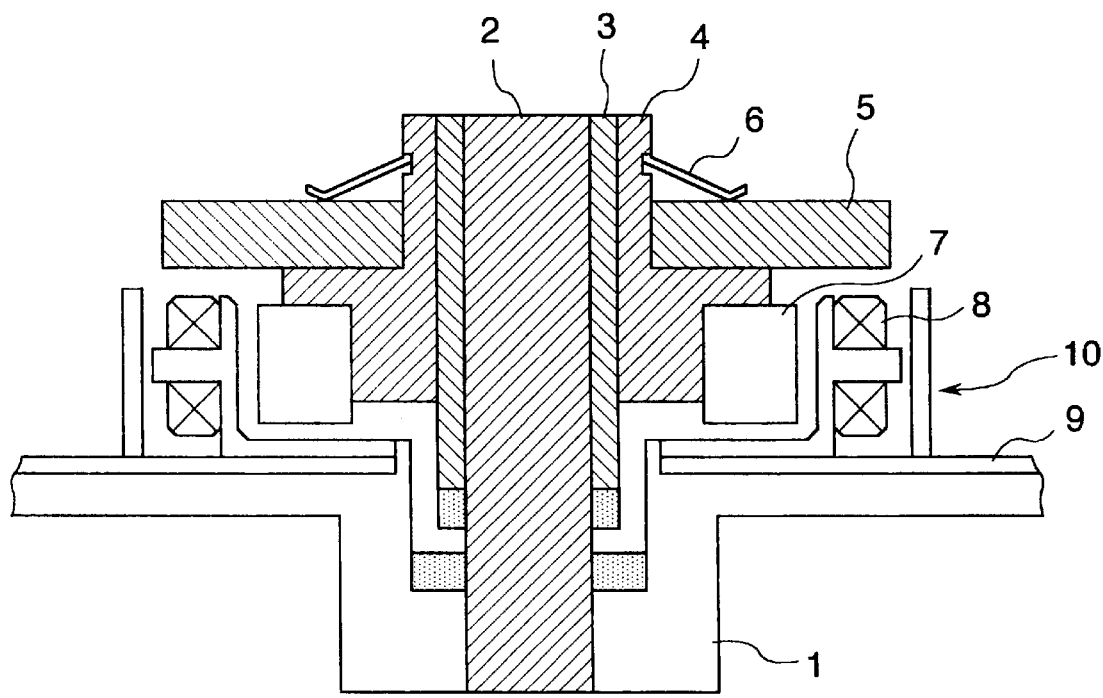
FIG. 1 is a sectional view showing a conventional bearing rotating apparatus.
Figure 2:
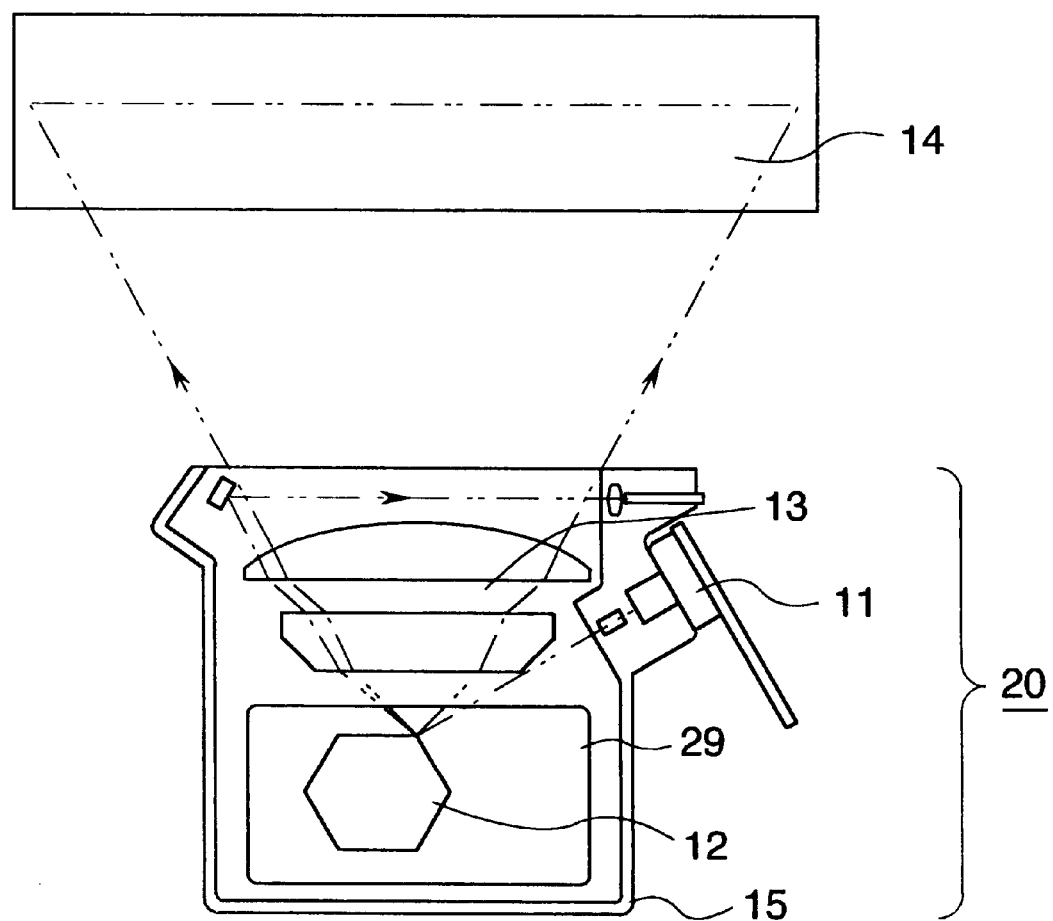
FIG. 2 is a plan view showing the overall arrangement of a laser beam printer using a deflecting/scanning apparatus of the present invention.

FIG. 2 is a plan view showing the overall arrangement of a laser beam printer using a deflecting/scanning apparatus of the present invention. A laser beam from a laser unit 11 emerges toward a rotating polygon mirror 12. When the rotating polygon mirror 12 is rotated, a light beam reflected by the rotating polygon mirror 12 is focused by a lens group 13 to be deflected/scanned on a photosensitive member 14 as a recording medium.

Figure 3:
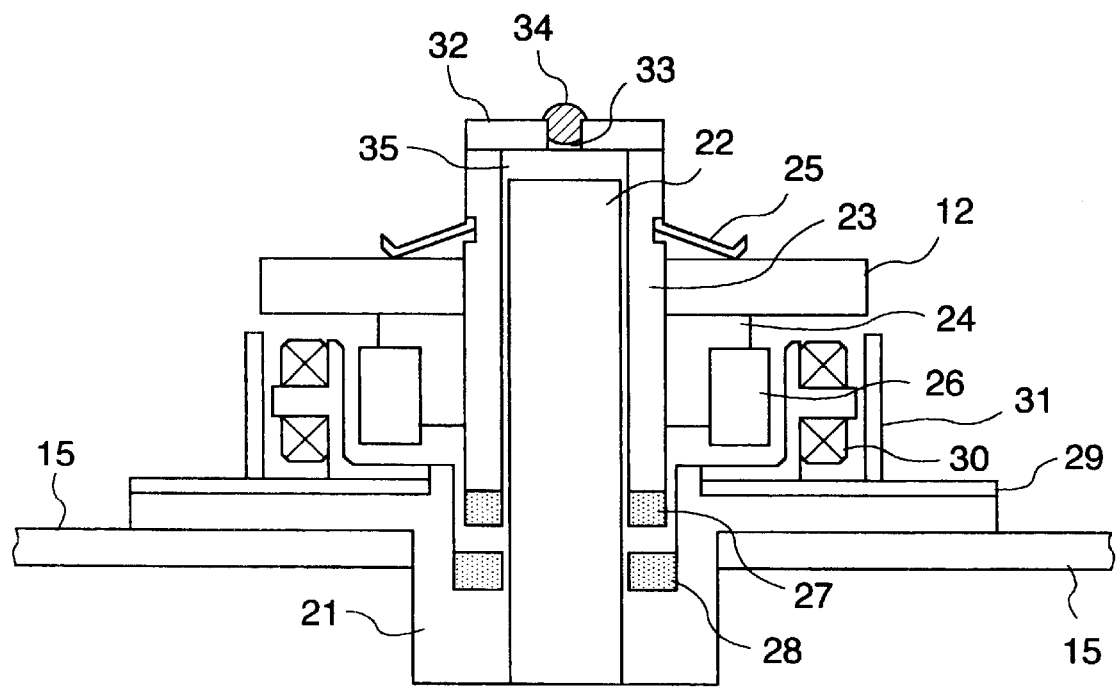
FIG. 3 is a sectional view showing a bearing rotating apparatus according to the present invention.

FIG. 3 is a sectional view showing a bearing rotating apparatus of the present invention, which rotates/supports the rotating polygon mirror 12 described above. A stationary shaft 22 is fixed to the center of a motor housing 21 mounted on a frame 15 of the deflecting/scanning apparatus. A rotating sleeve 23 is rotatably fitted on the stationary shaft 22 to form a bearing portion. The stationary shaft 22 and the rotating sleeve 23 are made of a ceramic material. A flange 24 made of a metal material such as aluminum or brass is mounted on the outer circumferential surface of the rotating sleeve 23 by means of shrink fit or the like. The rotating polygon mirror 12 is fixed to the flange 24 with a leaf spring 25. A drive magnet 26 is fitted to the flange 24 by means of an adhesive or the like.

A permanent magnet 27 is fixed to the lower side of the rotating sleeve 23 by means of an adhesive or the like. Similarly, a permanent magnet 28 is fixed at a position where it repels/opposes the permanent magnet 27 by means of an adhesive or the like. A circuit board 29 is disposed in the motor housing 21. A stator 30 is mounted on the circuit board 29 at a position where the stator opposes the drive magnet 26. In addition, a magnetic stack plate 31 is mounted around the stator 30. A drive motor for rotating the rotating sleeve 23 is constituted by the drive magnet 26, the circuit board 29, the stator 30, and the magnetic stack plate 31.

A lid 32 as a cover member made of a metal material such as aluminum or stainless steel or a synthetic resin material is mounted on the rotating sleeve 23 by means of an adhesive or the like. A vent hole 33 is formed in the lid 32. After the rotating sleeve 23 on which the lid 32 is mounted is fitted on the stationary shaft 22, the vent hole 33 is sealed with an adhesive 34 to form an air damper chamber 35 exhibiting a damper effect with respect to the movement of the rotating sleeve 23 in the thrust direction.

As described above, the lid 32 is mounted on the upper portion of the end face of the rotating sleeve 23 to cover the stationary shaft 22 so as to form an air reservoir.

Since the lid 32 using a separate member and having the vent hole 33 is fitted/fixed on the upper portion of the end face of the rotating sleeve 23 consisting of a ceramic material in this manner, the rotating sleeve 23 can be easily fitted on the stationary shaft 22. By sealing the vent hole 33 with an adhesive, the air damper chamber 35, which prevents the rotating sleeve 23 from moving vertically in the thrust direction to allow more stable rotation, can be easily formed. The rotating polygon mirror 12 which is floating owing to the repelling force between the permanent magnets 27 and 29 can therefore be rotated more reliably. Furthermore, if the rotating sleeve 23 and the lid 32 are integrally formed into a bag-like shape using a ceramic material, the air damper chamber 35 can be easily formed.

Assume that the diameter of the vent hole 33 formed in the lid 32 is limited to the range of 0.5 mm to 1.0 mm. In this case, if the viscosity of the adhesive 34 to be used is set to be 27,000 [cps/25° C.] or more, the adhesive can be restrained from flowing into the air damper chamber 35 in the process of curing the adhesive. Sealing of the vent hole 33 is also facilitated.

When the diameter of the vent hole 33 is limited to the range of 0.5 mm to 1.0 mm, a more advantageous effect can be obtained if an ultraviolet curing adhesive is used as the adhesive 34, and its viscosity is set to be 27,000 [cps/25° C.] or more. In addition, if a solid substance such as beads is mixed with the adhesive 34 to increase its viscosity resistance, the adhesive 34 can be reliably prevented from flowing into the air damper chamber 35, and the vent hole 33 can be completely sealed.

If a material having a thermal expansion coefficient close to or smaller than that of the ceramic material for the rotating sleeve 23 is used as a material for the lid 32, an offset, peeling, and the like at the fixed surface between the rotating sleeve 23 and the lid 32 due to temperature changes in the ambient atmosphere or the bearing can be prevented.

As has been described above, according to the deflecting/scanning apparatus of the present invention, an air damper chamber can be easily formed by fitting a lid having a vent hole on the upper portion of the end face of a rotating sleeve, and sealing the vent hole with an adhesive.

What is claimed is:

1. A deflecting/scanning apparatus for deflecting/scanning a light beam, comprising:

a stationary shaft;

a rotating sleeve rotatably fitted on said stationary shaft;

a cover member mounted on an end face of said rotating sleeve to cover said stationary shaft so as to form an air reservoir, said cover member having a vent hole sealed with an adhesive so as to remain closed at all operational rotational speeds of said rotating sleeve;

drive means for rotating said rotating sleeve; and a deflector mounted on said rotating sleeve to deflect/scan the light beam.

2. An apparatus according to claim 1, wherein said deflector is a polygon mirror.

3. An apparatus according to claim 1, wherein said stationary shaft and said rotating sleeve are each formed of ceramic material.

4. An apparatus according to claim 1, wherein said rotating sleeve and said cover member are separate members.

5. An apparatus according to claim 3, wherein said rotating sleeve and said cover member are separate members, and said cover member is formed of a material having a thermal expansion coefficient close to or smaller than a thermal expansion coefficient of the ceramic material of said rotating sleeve.

6. An apparatus according to claim 1, wherein the vent hole has a diameter within a range of 0.5 mm to 1.0 mm, and the adhesive has a viscosity not less than 27,000 (cps/25° C.).

7. An apparatus according to claim 1, wherein the adhesive is an ultraviolet curing adhesive.

8. An apparatus according to claim 1, wherein the adhesive is an adhesive in which beads are mixed.

9. A bearing rotating apparatus comprising:

a stationary shaft;

a rotating sleeve rotatably fitted on said stationary shaft;

a cover member mounted on an end face of said rotating sleeve to cover said stationary shaft so as to form an air reservoir, said cover member having a vent hole sealed with an adhesive so as to remain closed at all operational rotational speeds of said rotating sleeve; and drive means for rotating said rotating sleeve.

10. An apparatus according to claim 9, wherein said stationary shaft and said rotating sleeve are each formed of ceramic material.

11. An apparatus according to claim 9, wherein said rotating sleeve and said cover member are separate members.

12. An apparatus according to claim 10, wherein said rotating sleeve and said cover member are separate members, and said cover member is formed of a material having a thermal expansion coefficient close to or smaller than a thermal expansion coefficient of the ceramic material of said rotating sleeve.

13. An apparatus according to claim 9, wherein the vent hole has a diameter within a range of 0.5 mm to 1.0 mm, and the adhesive has a viscosity not less than 27,000 (cps/25° C.).

14. An apparatus according to claim 9, wherein the adhesive is an ultraviolet curing adhesive.

15. An apparatus according to claim 9, wherein the adhesive is an adhesive in which beads are mixed.

16. A bearing apparatus comprising:

a stationary shaft;

a rotating sleeve rotatably fitted on said stationary shaft; and a cover member mounted on an end face of said rotating sleeve to cover said stationary shaft so as to form an air reservoir, said cover member having a vent hole sealed with an adhesive so as to remain closed at all operational rotational speeds of said rotating sleeve.

17. An apparatus according to claim 16, wherein said stationary shaft and said rotating sleeve are each formed of ceramic material.

18. An apparatus according to claim 16, wherein said rotating sleeve and said cover member are separate members.

19. An apparatus according to claim 17, wherein said rotating sleeve and said cover member are separate members, and said cover member is formed of a material having a thermal expansion coefficient close to or smaller than a thermal expansion coefficient of the ceramic material of said rotating sleeve.

20. An apparatus according to claim 16, wherein the vent hole has a diameter within a range of 0.5 mm to 1.0 mm, and the adhesive has a viscosity not less than 27,000 (cps/25° C.).

21. An apparatus according to claim 16, wherein the adhesive is an ultraviolet curing adhesive.

22. An apparatus according to claim 16, wherein the adhesive is an adhesive in which beads are mixed.

23. A deflecting/scanning apparatus for deflecting/scanning a light beam from a light source, comprising:

a stationary shaft;

a rotating sleeve rotatably fitted on said stationary shaft;

a cover member mounted on an end face of said rotating sleeve to cover said stationary shaft so as to form an air reservoir, said cover member having a vent hole sealed with an adhesive so as to remain closed at all operational rotational speeds of said rotating sleeve;

a light source; and a deflector mounted on said rotating sleeve to deflect/scan the light beam from the light source.

24. An apparatus according to claim 23, wherein said deflector is a polygon mirror.

25. An apparatus according to claim 23, wherein said stationary shaft and said rotating sleeve are each formed of ceramic material.

26. An apparatus according to claim 23, wherein said rotating sleeve and said cover member are separate members.

27. An apparatus according to claim 25, wherein said rotating sleeve and said cover member are separate members, and said cover member is formed of a material having a thermal expansion coefficient close to or smaller than a thermal expansion coefficient of the ceramic material of said rotating sleeve.

28. An apparatus according to claim 23, wherein the vent hole has a diameter within a range of 0.5 mm to 1.0 mm, and the adhesive has a viscosity not less than 27,000 (cps/25° C.).

29. An apparatus according to claim 23, wherein the adhesive is an ultraviolet curing adhesive.

30. An apparatus according to claim 23, wherein the adhesive is an adhesive in which beads are mixed.

31. A laser beam printer comprising:

a stationary shaft;

a rotating sleeve rotatably fitted on said stationary shaft;

a cover member mounted on an end face of said rotating sleeve to cover said stationary shaft so as to form an air reservoir, said cover member having a vent hole sealed with an adhesive so as to remain closed at all operational rotational speeds of said rotating sleeve;

drive means for rotating said rotating sleeve;

a light source;

a deflector mounted on said rotating sleeve to deflect/scan a light beam from said light source; and a photosensitive member for receiving the light beam deflected/scanned by said deflector.

32. A printer according to claim 31, wherein said deflector is a polygon mirror.

33. A printer according to claim 31, wherein said stationary shaft and said rotating sleeve are each formed of ceramic material.

34. A printer according to claim 31, wherein said rotating sleeve and said cover member are separate members.

35. A printer according to claim 33, wherein said rotating sleeve and said cover member are separate members, and said cover member is formed of a material having a thermal expansion coefficient close to or smaller than a thermal expansion coefficient of the ceramic material of said rotating sleeve.

36. A printer according to claim 31, wherein the vent hole has a diameter within a range of 0.5 mm to 1.0 mm, and the adhesive has a viscosity not less than 27,000 (cps/25° C.).

37. A printer according to claim 31, wherein the adhesive is an ultraviolet curing adhesive.

38. A printer according to claim 31, wherein the adhesive is an adhesive in which beads are mixed.

* * * * *

UNITED STATES PATENT AND TRADEMARK OFFICE
CERTIFICATE OF CORRECTION

PATENT NO. : 5,900,903
DATED : May 4, 1999
INVENTOR(S) : Taku Fukita

It is certified that error appears in the above-indentified patent and that said Letters Patent is hereby corrected as shown below:

ON THE COVER PAGE

[54] "DEFLECTING SCANNING" should read --DEFLECTING/SCANNING--.

COLUMN 1 line 1, "DEFLECTING SCANNING" should read --DEFLECTING/SCANNING--.

line 19, "drive, magnet" should read --drive magnet--.

Signed and Sealed this

Second Day of November, 1999

Attest:

Q. TODD DICKINSON

Attesting Officer     Acting Commissioner of Patents and Trademarks